United States Patent [19]

Duval

[11] 4,288,329
[45] Sep. 8, 1981

[54] METHOD AND APPARATUS FOR CLEANING FINE WASTE MATERIAL MIXED WITH OIL AND WATER

[76] Inventor: Leonard A. Duval, 207 Harmon Rd., Aurora, Ohio 44202

[21] Appl. No.: 93,004

[22] Filed: Nov. 9, 1979

[51] Int. Cl.³ .......................... B01D 21/02; B08B 3/10
[52] U.S. Cl. ..................................... 210/772; 134/10; 134/12; 210/804; 210/259
[58] Field of Search .................... 134/12, 10, 109, 156, 134/25 R, 40; 210/73 UW, 21, 22 R, 511, 259; 209/38, 214

[56] References Cited

U.S. PATENT DOCUMENTS

| | | | |
|---|---|---|---|
| 3,544,369 | 12/1970 | Keogh, Jr. | 134/10 X |
| 3,844,943 | 10/1974 | Duval | 210/73 X |
| 3,865,629 | 2/1975 | Dankoff et al. | 134/12 X |
| 4,091,826 | 5/1978 | Bahrke | 134/12 X |

*Primary Examiner*—Frank A. Spear, Jr.
*Attorney, Agent, or Firm*—Baldwin, Egan, Walling & Fetzer

[57] ABSTRACT

A mixture of solids, mostly finely divided, and oil, such as usually mixed with mill scale, and water is the feed material for this process. Most of the water is first drawn off. Then the material is fed through a plurality of mixers, and after each mixer the entire composition is passed through a separator, herein described as a dewetting apparatus, which separates the fine solids from the oil and returns the expended solvent upstream toward the feed point. The diminished volume of material then passes through a final dewetting screen where the solids are washed by a small stream of fresh solvent and the fine solids then pass through a dryer. All expended solvent is collected and passed through a fractionating still which separates the recovered oil, for storage, and the solvent vapors pass through a condenser to a regenerated solvent storage tank. All of the expended solvent is saved and used over and over.

2 Claims, 1 Drawing Figure

METHOD AND APPARATUS FOR CLEANING FINE WASTE MATERIAL MIXED WITH OIL AND WATER

FIELD OF THE INVENTION

Sequential work treating receptacles or stations with means to transfer work of fluid-applying devices, with treating fluid purifying or separating means, and with liquid-moving recirculation, or flow reversing, and straining means.

PRIOR ART

U.S. Pat. No. 3,844,943 granted Oct. 29, 1974 to Leonard A. Duval for Method and Apparatus for Processing Waste Water Slimes of Steel Mill Water Treatment.

U.S. Pat. No. 4,091,826 granted May 30, 1978 to Ludwig Bahrke for Method for Degreasing Rolling Mill Scale.

SUMMARY OF THE INVENTION

Feed for the system of this invention includes finely divided solids, such as rolling mill scale mixed with a heavy oil and with water. Much of the water is decanted off the upper surface at a feed sump. Excess expended solvent is returned from the sump to an expended solvent storage tank. Then the solids are thoroughly mixed in a first mixer with a quite-expended solvent from a later portion of the system and this picks up oil from the solids. Then a slurry of solids plus some solvent from the first mixer is moved through a first dewetting separator that separates the solids from the solvent, which solvent is sent back countercurrent to the first mixer. The partially cleaned solids are then transferred to a second mixer. Then the solids are thoroughly mixed with a partially expended solvent from a later portion of the system which further washes the solids. Then a slurry of solids plus some solvent from the second mixer is moved through a second dewetting separator which separates the solids from the solvent, which is then sent back counter-current to the second mixer. All almost-clean solids are then transferred to a final dewetting screen where they are washed with a small amount of regenerated clean solvent. The solvent from the dewetting screen then goes to the expended solvent storage tank. Clean solids from the dewetting screen go through a dryer and are collected for use. The expended solvents in the storage tank are put through a still which separates solvent vapor which passes through a condenser to a regenerated solvent storage tank. The oil recovered from the still goes to oil storage.

Note that the solvent in this system is self-contained and used over and over, only requiring a small make-up from time to time.

Note that this system separates the water using the property of the heavier gravity of the solvent, whereas other similar systems use filters and dryers and larger area non-turbulent classifiers for the same purpose.

BRIEF DESCRIPTION OF THE DRAWINGS

The drawing is a diagrammatic layout of a system for carrying out the process of this invention.

DESCRIPTION OF PREFERRED EMBODIMENTS

Figure 1:
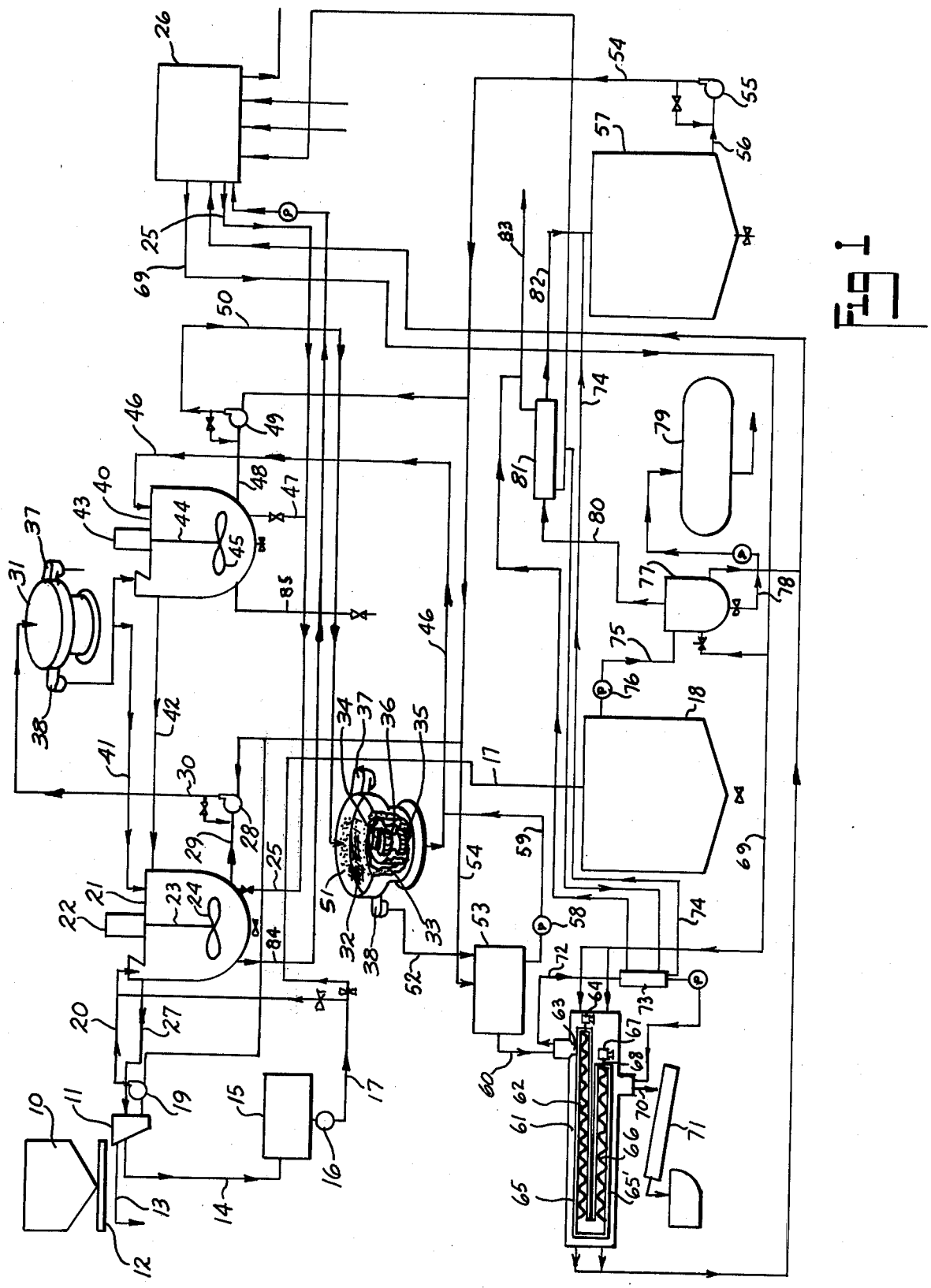

The feed of the material to be processed in this invention is passed through a screen of about ⅜ inch mesh to remove large pieces of miscellaneous material and then stored in a feed bin 10. It is then fed to a solvent-solids sump 11 using a plate 12 as shown in the drawing or using a vibratory feeder or a screw conveyor feeder.

The excess water in the feed material is drawn off at 13 and thrown away. The expended solvent which this process concentrates in the solvent-solid sump is then drawn off through line 14 through a settling tank 15 and then through pump 16 and line 17 which leads to an expended solvent storage tank 18.

A mixture of solvent and solids mixes through a centrifugal pump 19 and through line 20 to a first mixer 21. This mixer shown in the drawings has a motor 22 rotating a shaft 23 at the end of which is mounted a rotatable blade structure 24. Substantially any mixing device could be used at this point which would include also a rotary scrubber involving a rather generally horizontal cylinder having lifting blades extending axially through the cylinder or further pumping with centrifugal pumps as shown at 19, or a combination of such mixers. The expended solvent from the mixer 21 returns through line 27 to the sump 11.

It should be noted that a small amount of hot water may be added to a water jacket in the first mixer through a line 25 which runs from a boiler 26 at the upper righthand corner of the drawing. This may be necessary to increase the action of the solvent in the mixer.

A centrifugal slurry pump 28 moves a mixture of solvent and solids through line 29 and line 30 to a dewetting separator 31. This function might be filled by a screen-type dewetting apparatus as shown in the drawing or it could comprise a centrifuge or conveyor screw classifiers. The structure shown at 31 is a Sweco Vibro-Energy Separator made by Sweco, Inc. of Los Angeles, Calif. This Sweco Separator is a screening device having a layer of screen cloth 32 through which the solids and solvent must pass to a discharge dome 33 beneath the screen 32. The screening device is vibrated about its center of mass which is accomplished by eccentric weights 34 and 35 respectively at the upper and lower ends of the drive shaft of the electric motor 36. Rotation of the top weight creates vibration in the horizontal plane, which causes material to move across the screen cloth to the periphery. The lower weight 35 acts to tilt the machine, causing vibration in the vertical and tangential planes. The angle of lead given the lower weight with relation to the upper weight provides variable control of the spiral screening pattern.

The oversize solids are discharged at the outlet 37 and are recycled or thrown away. The fine solids which are the subject of recovery in this invention, are discharged at 38 and travel through line 39 to mixer 40. The expended solvent from the dewetter separator 31 travels through line 41 back to the first mixer 21. A balance line 42 extends from mixer 1 to mixer 2 to insure that the two mixers work properly in synchronous condition.

The fine solids from the line 39 together with the included solvent material pass into the No. 2 mixer 40. This is a closed vessel having a motor 43 rotating a shaft 44 which has a mixer blade structure 45 at its lower end. Solvent in the No. 2 mixer is provided through a solvent return line 46 which returns from a later described dewetting screen. Hot water may be provided to a water jacket in mixer 40 if necessary from line 47 which is also connected to line 25 previously described.

The mixture discharged from the No. 2 mixer 40 travels through line 48 and centrifugal slurry pump 49 through line 50 to a second dewetting separator 51. This is like that already described at 31. Solvent from the dewetting separator 51 passes through line 46 back to the No. 2 mixer. Solids from the dewetting separator 51 pass through line 52 to a dewetting screen apparatus 53. Here the fine solids, practically free of earlier solvents, is now washed with a small amount of fresh regenerated clear solvent through line 54 supplied by centrifugal pump 55 connected at 56 with a regenerated solvent storage tank 57. Excess solvent from the dewetting screen 53 is carried by pump 58 through line 59 to line 46.

The clean fine solids from the dewetting screen 53 pass through line 60 to a dryer 61. The dryer shown here is known as a Holoflite jacketed screw dryer and is made by several manufacturers. The dryer consists of a screw conveyor 62, moving solids from the input 63 from left to right, as shown in the drawing, by means of a motor 64, whose shaft drives the screw conveyor 62 in the proper direction. 65 indicates a steam jacket which encloses the conveyor 62 and is supplied with steam through line 65 from boiler 26. At left end of the drawing, the solid drop from the upper conveyor screw into the lower conveyor screw 66 which is driven by motor 67 and its connected shaft 68 to drive the conveyor from left to right as seen in the drawing. The steam jacket 65' surrounding the conveyor 66 is supplied by steam through line 69 coming from boiler 26. the dry fine solids then exit from the dryer at 70 and are carried by a screw conveyor 71, or by other means to a place for transportation. Solvent vapors are carried by line 72 thorugh a condenser 73 and then through line 74 back to the regenerated solvent tank 57.

It will be noted that in this invention all of the expended solvent finally goes back to feed sump and from there though lines 14 and 17 to the expended solvent storage tank 18. From time to time, the expended solvent is pumped through line 75 by pump 76 to a fractionating still 77 which separates out the recovered oil which passes through line 78 to a recovered oil storage tank 79. Solvent vapor from the still 77 passes through line 80 and condenser 81 and the recovered solvent passes through line 82 to the regenerated solvent tank 57.

Note that the solvent involved in the operation of the system of this invention is self-contained and is used over and over, only requiring a small make-up from time to time.

The solvent described and claimed in this invention may be a chlorinated hydrocarbon and a preferred form, specifically described herein, is methylene chloride.

If the feed mechanism, described as the plate 12 herein, is substituted by a screw conveyor sealed to the sump 11, all of the system described herein following the sump 11 may be maintained under a slight pressure so as to minimize vapor losses.

Line 83 is a water discharge line. Lines 84 and 85 are drain lines. The unmarked lines leading into boiler 26 are water, gas and electricity. The parallel line leading out of boiler 26 is for blow down.

What is claimed is:

1. An apparatus for cleaning fine solid waste material mixed with oil and water, comprising one integrated system having at least two primary mixers and two primary dewetting separators and one final dewetting separator and three coacting centifugal pumps acting both for mixing and transportation of a slurry containing fine solid waste material and solvent, together with a final dryer of fine solids, a reservoir for expended solvent, a reservoir for regenerated solvent, and an evaporating still connected between said reservoirs, and a condenser for solvent vapors from said still, and conduit from said condenser to said regenerated solvent reservoir, and a storage tank for oil recovered from said fine solid waste material; said integrated system having a feed sump for receiving said fine solid waste material mixed with oil and water and in which much of said water floats on top, means for drawing off said water, a first of said pump connected to receive a mixture of partially expended solvent and fine solid waste material from said sump and to mix and transport said mixture to a first of said primary mixers, conduit means connected between the upper portion of said first mixer and said sump for moving partially expended solvent to said sump, a second of said pumps connected to receive a slurry of solvent and fine solid waste material from said first primary mixer and to transfer said slurry to a first of said primary dewetting separators, conduit means connected between said first primary separator and said first mixer to transfer partially expended solvent to said first mixer, conduit means connected to transfer partially cleaned fine solid waste material to a second of said mixers, a third of said pumps connected to receive a slurry of solvent and fine solid waste material from said second primary mixer and to transfer said slurry to a second of said primary dewetting separators, a partially expended solvent return line connected between said second primary dewetting separator and said second mixer, conduit means connected between said second primary dewetting separator and said final dewetting separator to transfer fine solid material thereto, conduit means connected between said final dewetting separator and said regenerated solvent reservoir through a solvent pump to transfer regenerated solvent to said final dewetting separator, means for transferring clean fine solid material from said final dewetting separator to said final dryer, means for receiving dry and clean fine solid material from said dryer, means receiving solvent vapors from said final dryer and condensing said vapors and returning solvent therefrom to said regenerated solvent reservoir, conduit means for returning expended solvent from said sump to said expended solvent reservoir.

2. A method of cleaning fine solid waste material mixed with oil and water, comprising one intergrated system including (a) first decanting most of the water at a feed point, then (b) mixing with solvent said solids-oil-water material thoroughly in a first mixer, (c) returning excess expended solvent from said first mixer to said feed point, (d) then pumping the slurry of solids and solvents to a first dewetter-separator device, (e) transferring expended solvent from said first dewetter-separator device back to said first mixer, (f) transferring solids from said first dewetter-separator device to a second mixer, (g) thoroughly mixing with solvent these latter solids in the second mixer, (h) pumping the slurry of solids-solvent-water from said second mixer to a second dewetting-separator device, (i) transferring expended solvent from said second dewetting-separator device to said second mixer, (j) transferring solids from said second dewetting-separator device to a dewetting screen, (k) washing said solids on said dewetting screen with a small amount of clean solvent, (l) transferring expended solvent from said dewetting screen to said second mixer, (m) transferring solids from said dewetting screen to a dryer, (n) drying said solids in said dryer for use, (o) collecting all said expended solvent and passing it through a fractioning still and collecting therefrom the recovered oil, and (p) passing the solvent vapor through a condenser and to a regenerated solvent storage.

* * * * *